US 6,577,106 B2

(12) United States Patent
Lazarovich

(10) Patent No.: US 6,577,106 B2
(45) Date of Patent: Jun. 10, 2003

(54) MULTI-FUNCTIONAL AC/DC CONVERTER

(75) Inventor: David Lazarovich, Thornhill (CA)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/085,788

(22) Filed: Oct. 19, 2001

(65) Prior Publication Data

US 2002/0126518 A1 Sep. 12, 2002

Related U.S. Application Data

(60) Provisional application No. 60/250,390, filed on Nov. 30, 2000.

(51) Int. Cl.[7] .............................................. H01M 10/46
(52) U.S. Cl. ....................................................... 320/137
(58) Field of Search ................................. 320/106, 110, 320/125, 128, 137, 160, 150, 153

(56) References Cited

U.S. PATENT DOCUMENTS

| | | | |
|---|---|---|---|
| 4,885,523 A | * | 12/1989 | Koenck |
| 5,019,717 A | | 5/1991 | McCurry et al. |
| 5,390,099 A | | 2/1995 | Rilly et al. |
| 5,477,132 A | | 12/1995 | Canter et al. |
| 5,606,244 A | | 2/1997 | Migdal |
| 5,754,414 A | | 5/1998 | Hanington |
| 5,761,057 A | | 6/1998 | Muchenberger |
| 5,781,422 A | | 7/1998 | Lavin et al. |
| 5,783,872 A | | 7/1998 | Blair |
| 5,864,221 A | | 1/1999 | Downs et al. |
| 5,920,162 A | | 7/1999 | Hanson et al. |
| 5,920,471 A | | 7/1999 | Rajagopalan et al. |
| 5,994,885 A | | 11/1999 | Wilcox et al. |
| 6,005,336 A | | 12/1999 | Helbig et al. |
| 6,023,158 A | | 2/2000 | Liu |
| 6,075,352 A | | 6/2000 | Kates et al. |
| 6,091,233 A | | 7/2000 | Hwang et al. |
| 6,101,106 A | | 8/2000 | Shi |
| 6,104,172 A | | 8/2000 | Josephs et al. |
| 6,154,015 A | | 11/2000 | Ichiba |

* cited by examiner

Primary Examiner—Edward H. Tso
(74) Attorney, Agent, or Firm—Larry J. Palguta

(57) ABSTRACT

A multi-functional AC to DC converter (100) controls AC to DC conversion as a function of at least one characteristic of a battery (200) connected to a DC power bus (300), such that the voltage output by the converter (100) to the DC power bus (300) is varied to efficiently charge the battery (200). In one implementation of the present invention, a multi-functional AC to DC converter (100) also adjusts the voltage output to the DC power bus based on a starting condition of an auxiliary power unit (400) so that the supplied voltage is suitable for starting the APU (400). The present invention is suitable for implementation in an aircraft power system to maintain the voltage output within the compliance range of the DC power bus (e.g., between 27.5 and 29 Vdc) while adjusting the output voltage to efficiently charge a battery (200) connected to the bus (300) and/or start an APU (400) connected to the bus (300).

23 Claims, 4 Drawing Sheets

MULTI-FUNCTIONAL AC/DC CONVERTER

RELATED APPLICATION

This application claims priority under 35 U.S.C. §119(e) of U.S. Provisional Application No. 60/250,390 filed on Nov. 30, 2000, the entire contents of which are herein incorporated by reference.

BACKGROUND OF THE INVENTION

1. Field of the Invention

This invention relates to an AC to DC converter of an electrical power system.

2. Description of Related Art

A conventional power system design includes a Transformer Rectifier Unit ("TRU") as a main DC power source, the output voltage of which varies with applied load. Due to the varying nature of its output voltage, the TRU has been considered unsuitable for charging batteries that are relied on for backup/auxiliary power supply. Specifically, the varying nature of the TRU output voltage does not enable a constant potential or constant current charging mode. To address this drawback, some systems use an ON/OFF device to connect and disconnect the battery from the TRU bus to improve charging performance.

Another conventional approach utilizes a DC generator as a main power source to generate a constant output voltage. Although such a DC generator is suitable for charging batteries at constant potential, this approach can neither limit the current flowing into the battery at the beginning of the starting cycle nor compensate for temperature variations, which strongly influence the battery State of Charge ("SOC"). Also, by not controlling the amount of trickle charge, the DC generator causes the battery to lose electrolytes over time.

Yet another conventional approach utilizes a Regulated Transformer Rectifier Unit ("RTRU") as a main DC source with constant output voltage. The RTRU can charge batteries at constant potential, but can neither limit the current flowing into the battery nor compensate for temperature variations. Also, by not controlling the amount of trickle charge, the RTRU causes the battery to lose electrolytes over time.

Due to the above drawbacks, additional equipment, such as a separate battery charger, is commonly used in addition to the main DC power source. Since the charging voltage may be high at times, the battery must be disconnected from the main DC bus of the power system during charging. This requires special power bus arrangements and restricts the use of the battery as a bus presence, thereby affecting DC power system flexibility and quality.

SUMMARY OF THE INVENTION

The present invention addresses these drawbacks of conventional power system designs by providing a multi-functional AC to DC converter that controls AC to DC conversion as a function of at least one characteristic of a battery connected to a DC power bus, such that the voltage output by the converter to the DC power bus is varied to efficiently charge the battery while providing power for the bus connected loads. In one implementation of the present invention, a multi-functional AC to DC converter also adjusts the voltage output to the DC power bus based on a starting condition of an auxiliary power unit ("APU") so that the supplied voltage is suitable for starting the APU. The present invention is suitable for implementation in an aircraft power system to maintain the voltage output within the compliance range of the DC power bus (e.g., between 27.5 and 29.5 Vdc) while adjusting the output voltage to efficiently charge a battery connected to the bus and/or start an APU connected to the bus.

In one embodiment of the present invention, a multifunctional AC to DC converter includes a power control unit that monitors the current level drawn by a recharging battery and controls the voltage output by the AC to DC conversion circuitry based on the charging state of the battery. In a first power control stage, in which the battery is completely or nearly discharged, the power control unit controls the output voltage to a relatively low level (within the compliance range of the power system) to prevent the battery from drawing an uncontrolled or excessive amount of current. As the battery charges, and its internal impedance increases, the power control unit allows the output voltage to increase, thereby maintaining the current flowing to the battery at an adequate level for efficiently charging the battery. When the output voltage reaches a threshold level, the power control unit initiates a second control stage to maintain the output voltage constant at the elevated level (e.g., near the upper compliance limit of the DC power bus) so that the battery continues to charge, albeit at continually decreasing current. During this second power control stage, the power control unit in one implementation of the present invention controls output voltage as a function of battery temperature so that the output voltage is lower for higher battery temperatures and higher for lower battery temperatures. This temperature compensation improves the efficiency of the battery charging process. When the current drawn by the battery drops below a threshold level (e.g., indicating that the battery is about 80% percent recharged), the power control unit initiates a third power control stage to lower the output voltage to a nominal regulated level (e.g., 28 Vdc in an aircraft DC bus implementation) to trickle charge the battery (i.e., achieve constant potential trickle charge mode). This third power control stage prevents electrolyte loss during trickle charge.

By incorporating multiple functions in a single unit, the AC to DC converter of the present invention improves reliability because additional Line Replaceable Units ("LRUs") and associated switching devices are not required to connect/disconnect the charging battery to/from the DC power bus and requires less control and power wiring. Furthermore, because the recharging battery may be continuously connected to the DC power bus, the present invention enables No-Break-Power-Transfers (NBPT) in the DC subsystem during AC power interrupts or other system failures and reduces DC system weight and cost as compared to a system requiring a separate battery charger.

BRIEF DESCRIPTION OF THE DRAWINGS

Other aspects and advantages of the present invention will become apparent upon reading the following detailed description and upon reference to the drawings, in which.

DETAILED DESCRIPTION

Figure 1:
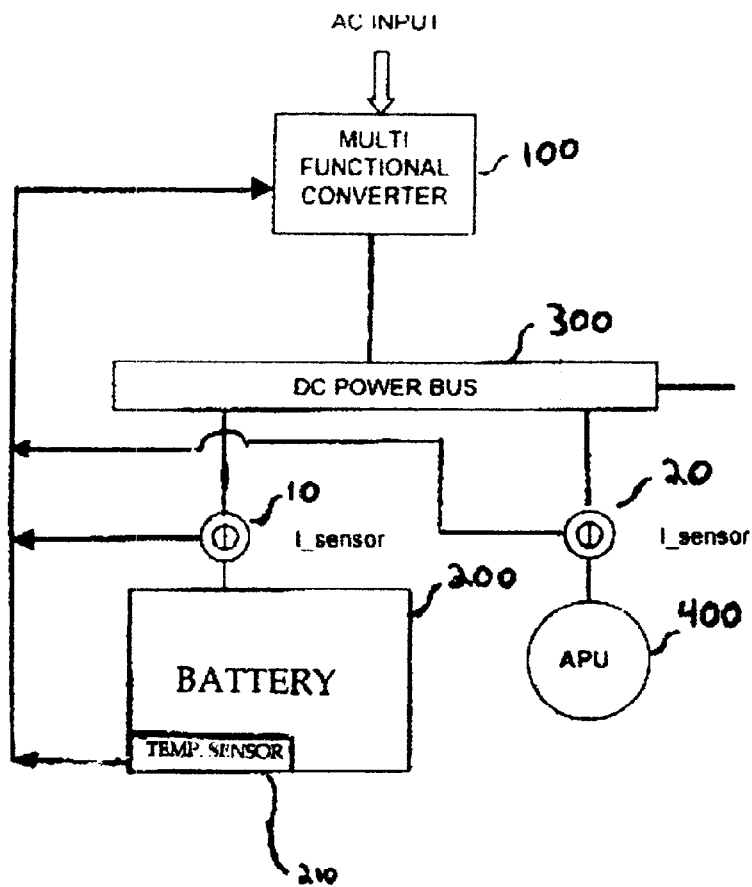
FIG. 1 is a block diagram illustrating an exemplary implementation of a multi-functional AC to DC converter and its integration into a typical aerospace DC Subsystem according to the present invention.

FIG. 1 illustrates an exemplary implementation of a multi-functional AC to DC converter and its integration into a typical aerospace DC Subsystem according to the present invention. In the exemplary implementation shown in FIG. 1, a multi-functional converter 100, a battery 200, and an auxiliary power unit 400 are connected to a DC power bus 300, which may be one of multiple DC power buses of an aircraft power subsystem. It should be readily apparent that various electrical loads and other elements may be connected to the DC power bus 300. The multi-functional converter 100 receives an AC input (e.g., 115 or 230 Vac) and outputs a voltage that is regulated in accordance with principles of the present invention discussed in detail below. A battery current sensor 10 is provided between the DC power bus 300 and the battery 200 to monitor current flow to the battery 200. Likewise, an APU current sensor 20 is provided between the DC power bus 300 and the APU 400 to monitor current flow to the APU 400.

The multi-functional converter 100 receives the output of the battery current sensor 10 and the APU current sensor 20, as well as the output of a temperature sensor 210, which monitors temperature of the battery 200. The multi-functional converter 100 also receives the point-of-regulation ("POR") voltage as an indication of increasing/decreasing load levels on the DC power bus 300. As described in detail below, the multi-functional converter 100 controls output voltage to be within the compliance range of the corresponding DC power subsystem (e.g., within the range of 27.5 to 29 Vdc for aircraft implementation) while adjusting the output voltage to efficiently recharge and prevent electrolyte loss of the battery 200. Furthermore, the multi-functional converter 100 adjusts the output voltage during start-up of the APU 400 to limit the starting current of the APU 400 to a level needed for efficient start up. The AC to DC converter 100 may independently start the APU 400 or assist a battery in the starting process.

Figure 2:
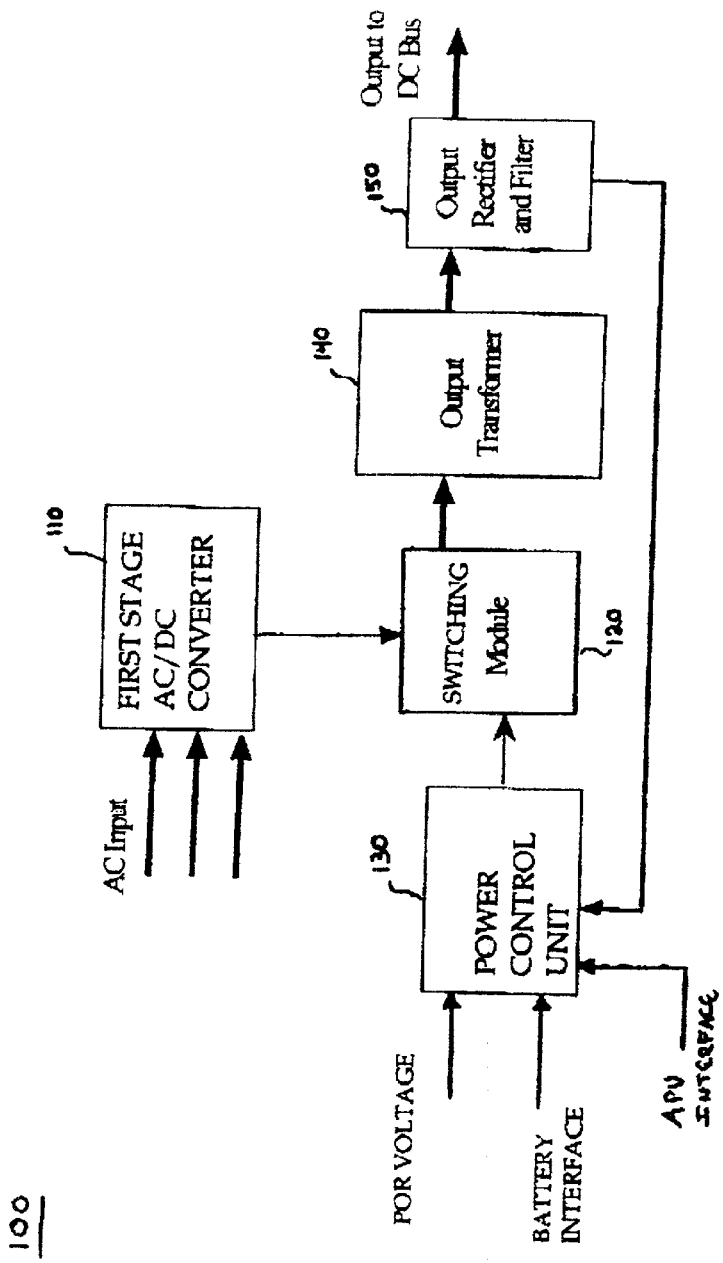
FIG. 2 is a block diagram of a multi-functional AC to DC converter according to an embodiment of the present invention.

FIG. 2 is a block diagram of a multi-functional AC to DC converter 100 configuration according to an embodiment of the present invention. As seen in FIG. 2, the multi-functional converter 100 includes: (a) a first stage AC/DC converter 110; (b) a switching module 120; (c) a power control unit 130; (d) an output transformer 140; (e) and an output rectifier and filter unit 150. As in a conventional power system design, the first stage AC/DC converter receives 3-phase AC voltage (e.g., 115 or 230 Vac at 400 Hz or variable frequency of 360 to 800 Hz) and converts the 3-phase AC voltage to an intermediate DC voltage (e.g., 270 Vdc). This initial AC to DC conversion may be performed by a combination of phase-conversion and rectification circuitry. For example, a 3-phase to 9-phase auto-transformer (not shown) may convert the input 3-phase voltage to a 9-phase AC voltage connected to an 18-pulse rectifier (not shown) to convert the resulting 9-phase AC voltage to DC voltage. It should be apparent that alternative configurations may be utilized to convert the input 3-phase voltage to an intermediate DC voltage. The switching module 120 converts the DC voltage output by the first stage AC/DC converter 110 to an AC voltage based on switch gating signals output by the power control unit 130. The switching module 120 may be implemented as a known "H-bridge" configuration of power devices, e.g., insulated gate bipolar transistors ("IGBTs") in which two IGBT pairs are alternatively activated to create an AC voltage across the primary winding of the output transformer 140.

According to the present invention, the switching control module 120 generates an AC voltage having a root-mean-square ("RMS") level that is controlled by the power-control unit 130 based on one or more of the following: (1) output of the battery current sensor 10; (2) output of the battery temperature sensor 210; (3) output of the APU current sensor 20; and (4) POR voltage, which indicates load on the DC power bus 300. This switching control is discussed in more detail below with reference to FIGS. 3 and 4. The AC voltage output by the switching module 120 is transformed to a lower AC voltage by the output transformer 140 (i.e., a step-down transformer). The lower AC voltage output by the output transformer 140 is rectified and filtered by the output rectifier and filter unit 150 to output a regulated voltage level to the DC power bus 300. The regulated voltage output by the output rectifier and filter unit 150 is also fed back to the power control unit 130 to assist regulating voltage to a desired level.

Figure 3:
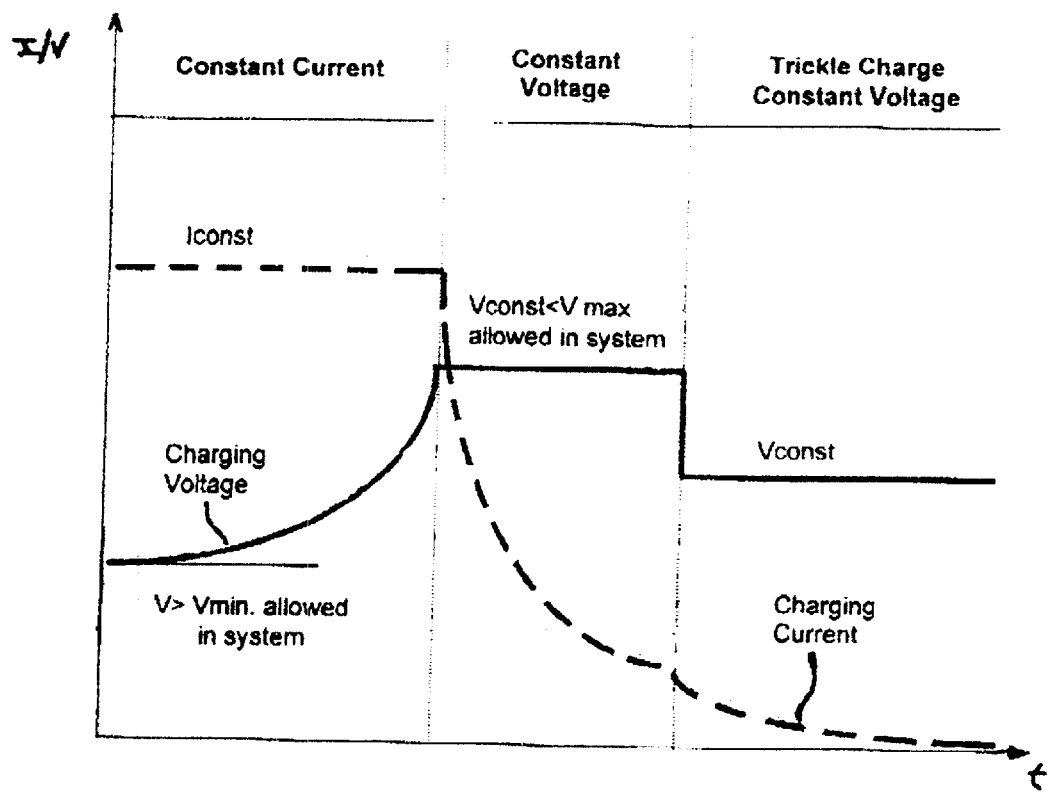
FIG. 3 is a diagram illustrating the power control stages utilized by a multi-functional AC to DC converter to implement a battery charging control sequence according to an embodiment of the present invention.

Operation of the power control unit 130 for achieving efficient battery charging will next be described with reference to the diagram of FIG. 3, which illustrates output voltage (solid line) and battery input current (dashed line), as measured by the battery current sensor 10, over a charging cycle of the battery 200. As illustrated in FIG. 3, the power control unit 130 operates to achieve three recharge stages of the battery 200 while maintaining the output voltage within the compliance range of the DC power bus 300 (e.g., between 27.5 and 29.5 Vdc). In a first power control stage, in which the battery is completely or nearly discharged, the power control unit 130 controls the output voltage to a relatively low level (within the compliance range of the power system) that maintains constant limited current flow into the battery 200. This power control stage prevents the battery 200 from drawing an uncontrolled or excessive amount of current which could damage the battery or overload the converter 100.

As the battery 200 charges, and its internal impedance increases, the power control unit 130 allows the output voltage to increase, thereby maintaining the current flowing to the battery 200 at a constant level. When the output voltage reaches a maximum threshold level, e.g., just under the upper compliance level of the DC power bus, the power control unit 130 initiates a second control stage to maintain the output voltage constant at or near the maximum converter output voltage so that the battery 200 continues to charge, albeit at continually decreasing current. During this second control stage, the charging current into the battery 200 decreases continually due to the increase in the internal battery impedance. During this second power control stage, the power control unit 130 in one implementation of the present invention controls output voltage as a function of battery temperature to optimize the battery charging process, such that the output voltage is made lower for higher battery temperatures and higher for lower battery temperatures. This temperature compensation improves battery charging efficiency.

Lastly, when the current drawn by the battery drops below a threshold level (e.g., indicating that the battery is about 80% percent recharged), the power control unit 130 initiates a third power control stage to lower the output voltage to a nominal regulated level (e.g., 28 Vdc in an aircraft DC bus implementation) to trickle charge the battery (i.e., achieve constant potential trickle charge mode). This voltage level is lower than the one employed during the second control stage in order to minimize the electrolyte loss. During this trickle charge constant voltage stage, the charging current into the battery 200 is maintained at a very low level (e.g., 1 amp or less). By following changes in battery current and output voltage of the converter 100 over time, the power control unit 130 can determine within certain limits the level of battery charge and output a signal indicating the estimated charge state of the battery. For example, the power control unit 130 may output a signal to the Flight Deck in an aircraft implementation to indicate readiness of the battery 200 for flight.

While controlling the output voltage of the converter 100, the power control unit 130 ensures that the output voltage is maintained within a range that is compliant with the requirements of the power quality standard in use for the application. This voltage level enables the battery 200 to be continuously connected to the DC power bus 300. Thus, the battery 200 is readily available during AC power interrupt or other system failures. The above-described battery charging stages may be implemented in the power control unit 130 in the form of a dedicated integrated circuit ("IC") card and may be implemented with hardware, software, or a combination of hardware and software. In order to optimize the charging process, the voltage applied may be temperature compensated, e.g., lower for higher battery temperatures and higher when low battery temperatures are measured.

Figure 4:
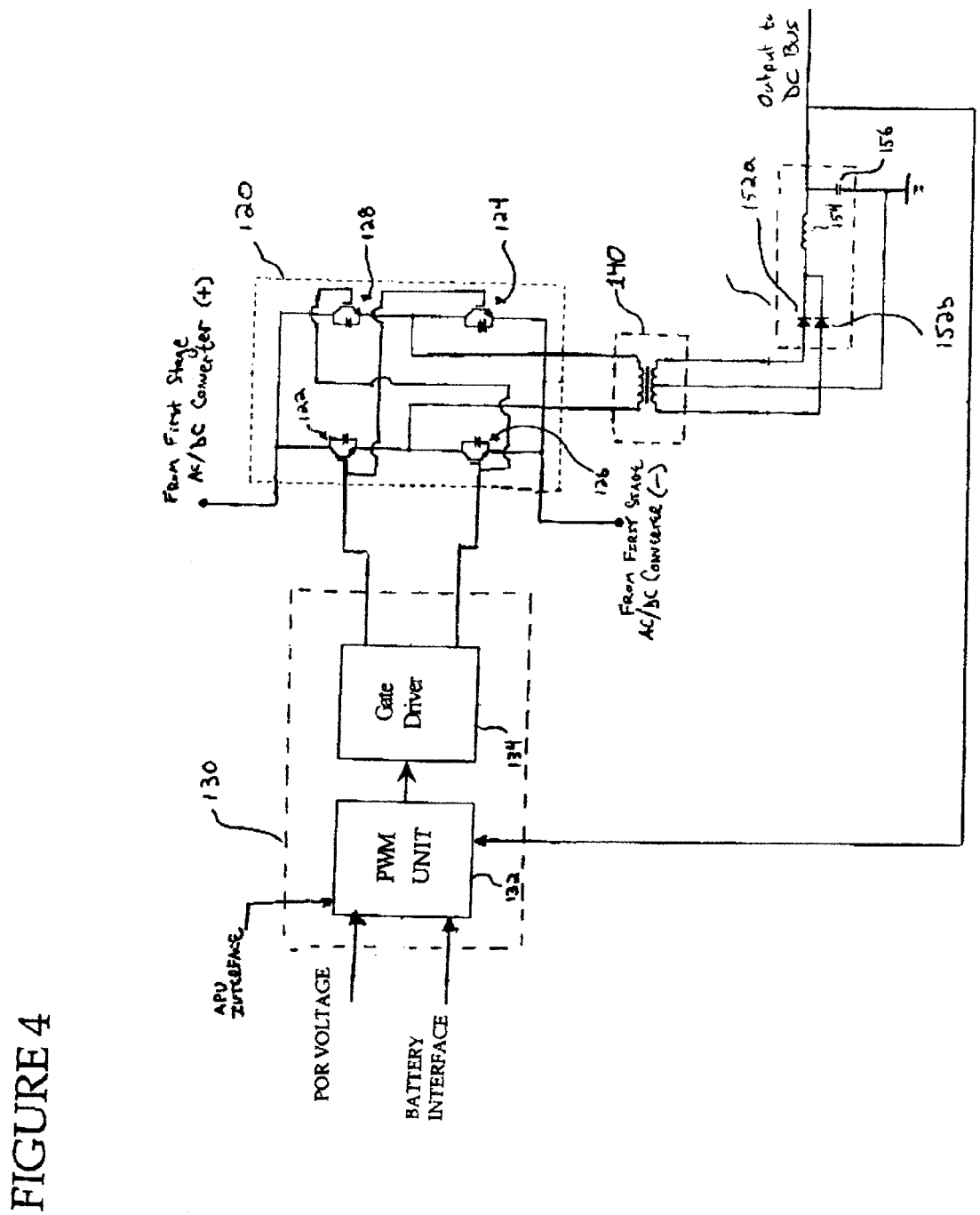
FIG. 4 is a block diagram of an exemplary DC/DC converter configuration, which is implemented as part of a multifunctional AC to DC converter in accordance with an embodiment of the present invention.

FIG. 4 illustrates an exemplary configuration for the power control unit 130, the switching module 120, the output transformer 140, and the output rectifier and filter unit 150. As shown in FIG. 4, the power control unit 130 includes a pulse width modulation ("PWM") unit 132 that receives a measure of POR voltage, current measurements for the battery 200 and APU 400, temperature of the battery 200, and a measure of output voltage of the converter 100. The PWM unit 132 generates a sequence of pulses, the width of which are varied depending on at least one characteristic of the battery 200 (e.g., depending on the battery charge state). The pulse width may further be adjusted to account for changes in load, reflected by the POR voltage, and to account for a start up condition of the APU 400. The PWM unit 132 outputs the generated PWM signal to the gate driver 134, which drives the switches of the switching module 120.

As seen in FIG. 4, the switching module 120 according to one implementation of the present invention is a conventional H-bridge configuration of power devices, which are n-channel IGBTs in the exemplary implementation shown in FIG. 4. The switching module 120 shown in FIG. 4 includes first, second, third, and fourth IGBT modules 122, 124, 126, and 128, each formed of an IGBT and an anti-parallel diode, the anode of the anti-parallel diode being connected to the emitter of the corresponding IGBT and the cathode being connected to the collector of the corresponding IGBT. The gates of the first, second, third, and fourth IGBT modules 122, 124, 126, and 128 are connected to receive an output of the gate driver 134. The first IGBT module 122 and the second IGBT module 124 (diagonally positioned) share a common connection to the gate driver 134, thus constituting a first IGBT module pair, and the third IGBT module 126 and the fourth IGBT module 128 (diagonally positioned) share a common connection to the gate driver 134, thus constituting a second IGBT module pair. The PWM switching signals output by the gate driver 134 to the IGBT module pairs are offset so that that IGBT module pairs alternately turn ON/OFF, thereby creating an AC voltage across the primary winding of the transformer 140, which is a center-tapped transformer in the exemplary configuration of FIG. 4.

As shown in FIG. 4, the collector of the first IGBT module 122 is connected to the (+) output of the first stage AC/DC converter 110. Likewise, the collector of the fourth IGBT module 128 is connected to the (+) output of the first stage AC/DC converter 110. The emitter of the first IGBT module 122 is connected to the collector of the third IGBT module 126 and to a first side of the primary winding of the output transformer 140. The emitter of the fourth IGBT module 128 is connected to the collector of the second IGBT module 124 and to a second side of the primary winding of the output transformer 140. The emitter of the third IGBT module 126 and the emitter of the second IGBT module 124 are connected to the (−) output of the first stage AC/DC converter 110. By alternately activating two switching module pairs formed of the first and second IGBT modules 122, 124 and the third and fourth IGBT modules 126, 128 respectively, the gate driver 134 causes the switching module 120 to create an alternating voltage across the primary winding of the output transformer 140. The RMS value of this alternating voltage is affected by the pulse width of the gating signals output by the gate driver 134, which is altered as a function of at least one of: battery charge characteristics, battery temperature, APU start condition, and POR voltage according to principles of the present invention.

As further shown in FIG. 4, the output rectifier and filter unit 150 includes a pair of diodes 152a, 152b, each connected to an end of the secondary winding of the output transformer 140 to convert the transformed AC voltage to DC. The output rectifier and filter unit 150 further includes an inductor 154 connected between the output of the pair of diodes 152a, 152b and the output of the output rectifier and filter unit 150 and a capacitor 156 connected between the output end of the inductor 154 and a negative terminal of the converter arrangement, which is shown as a grounded connection in the implementation of FIG. 4. This arrangement of the inductor 154 and the capacitor 156 filters the rectified DC voltage resulting from the pair of diodes 152a, 152b. It should be recognized that various alternative arrangements may be suitable for the output rectifier and filter unit 150.

Although operation of the power control unit 130 has been discussed above based on recharge characteristics of the battery 200, the power control unit 130 may also continuously monitor the current drawn by the APU 400 (as shown in FIG. 2.) When used in an APU start application, the power control unit 130 limits the starting current drawn by the APU 400 to a value which is suitable for the converter 110 to independently start the APU 400 or to start the APU 400 in conjunction with a battery. As further shown in FIG. 2, the power control unit 130 continuously monitors the POR voltage so as to regulate output voltage as a function of load. Increased load on the DC power bus 300 will cause higher losses to occur in the first stage AC to DC converter 110, which will result in lower RMS voltage applied to the output transformer 140. Thus, the power control unit 130 adjusts the pulse width for the switch gating signals output to the switching module 120 based on load levels to maintain the desired output voltage of the converter 100.

By incorporating multiple functions in a single unit, the AC to DC converter 100 of the present invention improves reliability because additional Line Replaceable Units ("LRUs") and associated switching devices are not required to connect/disconnect the charging battery 200 to/from the DC power bus 300 and requires less control and power wiring. Furthermore, because the recharging battery 200 may be continuously connected to the DC power bus 300, principles of the present invention enable No-Break-Power-Transfers (NBPT) in the DC subsystem during AC power interrupts or other system failures and reduces DC system weight and cost as compared to a system requiring a separate battery charger.

The foregoing merely illustrates the principles of the invention. It will be appreciated that those skilled in the art will be able to devise various arrangements which, although not explicitly described or shown herein, embody the sprit and scope of the present invention.

I claim:

1. A multi-functional apparatus for regulating voltage supplied to electrical loads and delivered to a rechargeable battery via a DC power bus, comprising:
   an AC to DC converter receiving an AC supply voltage, converting said AC supply voltage to a regulated DC voltage, and outputting said regulated DC voltage to said DC power bus; and
   a power controller controlling conversion performed by said AC to DC converter as a function of a characteristic of said battery.

2. The apparatus according to claim 1, wherein said DC power bus is a power bus of an aerospace power system with electrical load connected thereto.

3. The apparatus according to claim 1, wherein said power controller controls conversion performed by said AC to DC converter so that said AC to DC converter outputs a DC voltage that maintains a constant current flow into said battery from said DC bus during a first control mode.

4. The apparatus according to claim 3, wherein said power controller operates in said first control mode when said battery is in a low charge state.

5. The apparatus according to claim 1, wherein said power controller controls conversion performed by said AC to DC converter so that said AC to DC converter outputs a first constant DC voltage during a second control mode.

6. The apparatus according to claim 5, wherein said power controller operates in said second control mode when said regulated DC voltage output by said AC to DC converter reaches a threshold level.

7. The apparatus according to claim 1, wherein said power controller controls conversion performed by said AC to DC converter so that said AC to DC converter outputs a second constant DC voltage, which is lower than said first constant DC voltage, during a third control mode.

8. The apparatus according to claim 7, wherein said power controller operates in said third control mode when current drawn by said battery drops below a threshold level.

9. The apparatus according to claim 7, wherein said third control mode is a constant potential trickle charge mode.

10. The apparatus according to claim 1, wherein said regulated DC voltage is maintained within a compliance range of said DC power bus.

11. The apparatus according to claim 1, wherein said AC to DC converter includes:
    a first AC to DC conversion stage converting said AC supply voltage to an intermediate DC voltage;
    a switching module converting said intermediate DC voltage to an intermediate AC voltage;
    an output transformer transforming said intermediate AC voltage to a step-down AC voltage; and
    a rectifier converting said step-down AC voltage to a DC voltage.

12. The apparatus according to claim 11, wherein said AC to DC converter further includes:
    a filter filtering the DC voltage generated by said rectifier and outputting said regulated DC voltage to said DC power bus.

13. The apparatus according to claim 11, wherein said power controller generates a switch gating signal and outputs said switch gating signal to said switching module to control a root-mean-square level of said intermediate AC voltage.

14. The apparatus according to claim 13, wherein said switching module is an H-bridge configuration of transistors, each of which receives said switch gating signal.

15. The apparatus according to claim 13, wherein said power controller generates a pulse width modulated switching signal having a pulse width that varies depending on a recharge state of said battery.

16. The apparatus according to claim 15, wherein said power controller varies the pulse width of said pulse width modulated switching signal as a function of load on said DC power bus.

17. The apparatus according to claim 1, wherein said power controller controls conversion performed by said AC to DC converter as a function of temperature of said battery.

18. The apparatus according to claim 1, wherein said AC/DC converter outputs said regulated DC voltage to an auxiliary power unit via said DC power bus.

19. The apparatus according to claim 18, wherein said power controller further controls conversion performed by said AC to DC converter as a function of current drawn by said auxiliary power unit.

20. The apparatus according to claim 1, wherein said characteristic is the recharge state of said battery.

21. The apparatus according to claim 1, wherein said power controller controls conversion performed by said AC to DC converter as a function of a recharge characteristic of said battery, a temperature characteristic of said battery, and load on said DC power bus.

22. An aerospace DC power supply system, said aerospace DC power supply system utilizing a single AC to DC converter to supply a load connected to a DC power bus and to charge a battery continuously connected to said DC power bus in accordance with a multi-stage battery charging control scheme, wherein said system further utilizes said single AC to DC converter to start an auxiliary power unit connected to said DC power bus.

23. An aerospace DC power supply system, said aerospace DC power supply system utilizing a single AC to DC converter to supply a load connected to a DC power bus and to charge a battery continuously connected to said DC power bus in accordance with a multi-stage battery charging control scheme, wherein said AC to DC converter achieves temperature compensated charging of said battery.

* * * * *